(12) United States Patent
Barton

(10) Patent No.: US 6,576,361 B1
(45) Date of Patent: Jun. 10, 2003

(54) METHOD AND APPARATUS FOR ISOLATING A FUEL CELL ASSEMBLY FROM ITS SURROUNDINGS

(75) Inventor: Russell H. Barton, New Westminster (CA)

(73) Assignee: Ballard Power Systems Inc., Burnaby (CA)

( * ) Notice: Subject to any disclaimer, the term of this patent is extended or adjusted under 35 U.S.C. 154(b) by 130 days.

(21) Appl. No.: 09/710,561

(22) Filed: Nov. 9, 2000

(51) Int. Cl.$^7$ .......................... H01M 8/04; H01M 8/12; H01M 2/00; H01M 2/02; H01M 2/12; H01M 10/34; H01M 10/52

(52) U.S. Cl. .............................. 429/25; 429/34; 429/53; 429/57

(58) Field of Search .............................. 429/25, 34, 53, 429/57

(56) References Cited

U.S. PATENT DOCUMENTS 6,106,964 A    8/2000  Voss et al. ..................... 429/20

FOREIGN PATENT DOCUMENTS

| JP | 04-249867 | 4/1992 |
| JP | 11-086891 | 3/1999 |

*Primary Examiner*—Carol Chaney
*Assistant Examiner*—Donald V. Scaltrito
(74) *Attorney, Agent, or Firm*—McAndrews, Held & Malloy, Ltd.

(57) ABSTRACT

Access openings in a fuel cell assembly are isolated from their surroundings by use of a closure member that is actuated by the pressure in a fluid stream within the fuel cell assembly. An isolating apparatus prevents undesirable water loss or gain in certain fuel cell types and protects the fuel cell assembly from contamination.

22 Claims, 4 Drawing Sheets

METHOD AND APPARATUS FOR ISOLATING A FUEL CELL ASSEMBLY FROM ITS SURROUNDINGS

FIELD OF THE INVENTION

The present invention relates to a method and apparatus for isolating a fuel cell assembly from its surroundings, such as for protection against dehydration during shutdown or for other purposes, such as protection against contaminants.

BACKGROUND OF THE INVENTION

Electrochemical fuel cells convert reactants, namely, fuel and oxidant, into reaction products and in the process generate electric power. In a typical fuel cell using hydrogen gas as fuel and oxygen or compressed air as oxidant, the reaction product is water.

Solid polymer fuel cells typically employ a membrane electrode assembly (MEA) comprising a solid polymer electrolyte or ion exchange membrane disposed between two electrode layers. The membrane, in addition to being an ion conductive (typically proton conductive) material, also acts as a barrier for isolating the reactant fluid streams from each other. The MEA is interposed between two electrically conductive separator plates impermeable to the reactant flow streams and having flow channels forming flow fields to direct the fuel and oxidant to the respective electrode layers.

In a fuel cell stack, a plurality of fuel cells are connected together to increase the overall output power of the assembly. The fuel cell stack is interposed between a pair of end plates have inlet and outlet ports associated therewith for feeding and exhausting the oxidant and fuel fluid streams, respectively. The end plates may also have inlet and outlet ports associated therewith for flowing a coolant stream through the stack.

It is desirable that the ion-exchange membrane in the fuel cell stack be kept moist to maintain adequate ionic conductivity and to reduce structural damage that may result if the membranes are allowed to become too dry. It is known that leaks in membranes may occur near reactant stream inlet ports. Such leaks may be caused or worsened by membrane dehydration during fuel cell stack operation, thereby resulting in the formation of cracks or holes.

In a phosphoric acid electrolyte fuel cell stack, it is desirable to prevent water from entering the stack during shutdown periods. Additionally, it is desirable in some applications to protect the fuel cell stack from contaminants or other hazards, such as exposure to salt water, particularly in marine applications.

SUMMARY OF THE INVENTION

An improved method isolates an electrochemical fuel cell assembly from its surroundings, the fuel cell assembly having an access opening formed therein. The access opening is either of a reactant stream inlet port or a reactant stream outlet port for directing a working fluid stream (such as, for example, a coolant stream) to or from the fuel cell stack or other component in the fuel cell assembly (for example, a reactant stream humidifier). In a preferred embodiment, the access opening is an opening formed in an enclosure containing the fuel cell assembly. The improved method comprises the steps of:

(a) providing the access opening with a closure member that is normally biased to a closed position in which the access opening is closed, the closure member having a pressure activated actuator for urging the closure member to an open position when the actuator is exposed to pressure; and (b) operatively connecting the actuator to a fluid stream of the fuel cell assembly such that the actuator is exposed to fluid pressure of the fluid stream for urging the closure member to the open position, thereby opening the access opening.

In preferred embodiments, the access opening is an oxidant stream inlet or an oxidant stream outlet, and the fluid stream that provides the actuating pressure is a fuel stream.

An improved fuel cell assembly has an access opening formed therein through which the assembly is exposed to its surroundings. The improved assembly comprises a closure member that is movable between an open position and a closed position, the closure member being operatively associated with the access opening and normally biased to the closed position such that when the access opening is closed the fuel cell assembly is isolated from its surroundings. In operation, the closure member preferably includes a pressure-activated actuator for urging the closure member to the open position when the actuator is exposed to pressure. The actuator optionally comprises a conduit fluidly connected to a fluid stream of the fuel cell assembly for exposing the actuator to the fluid stream pressure and urging the closure member to the open position, thereby opening the access opening.

An improved fuel cell assembly also comprises a solid polymer electrolyte fuel cell comprising first and second fluid flow channels and an isolation valve that is switchable between a closed position and an open position for, respectively, closing and opening said first fluid flow channel. The valve is normally biased to the closed position for closing the first fluid flow channel during shutdown of the fuel cell assembly. The valve further includes an actuator that is responsive to fluid pressure in the second fluid flow channel during start up of the fuel cell assembly for switching the valve to the open position.

DETAILED DESCRIPTION OF PREFERRED EMBODIMENTS

Figure 1:
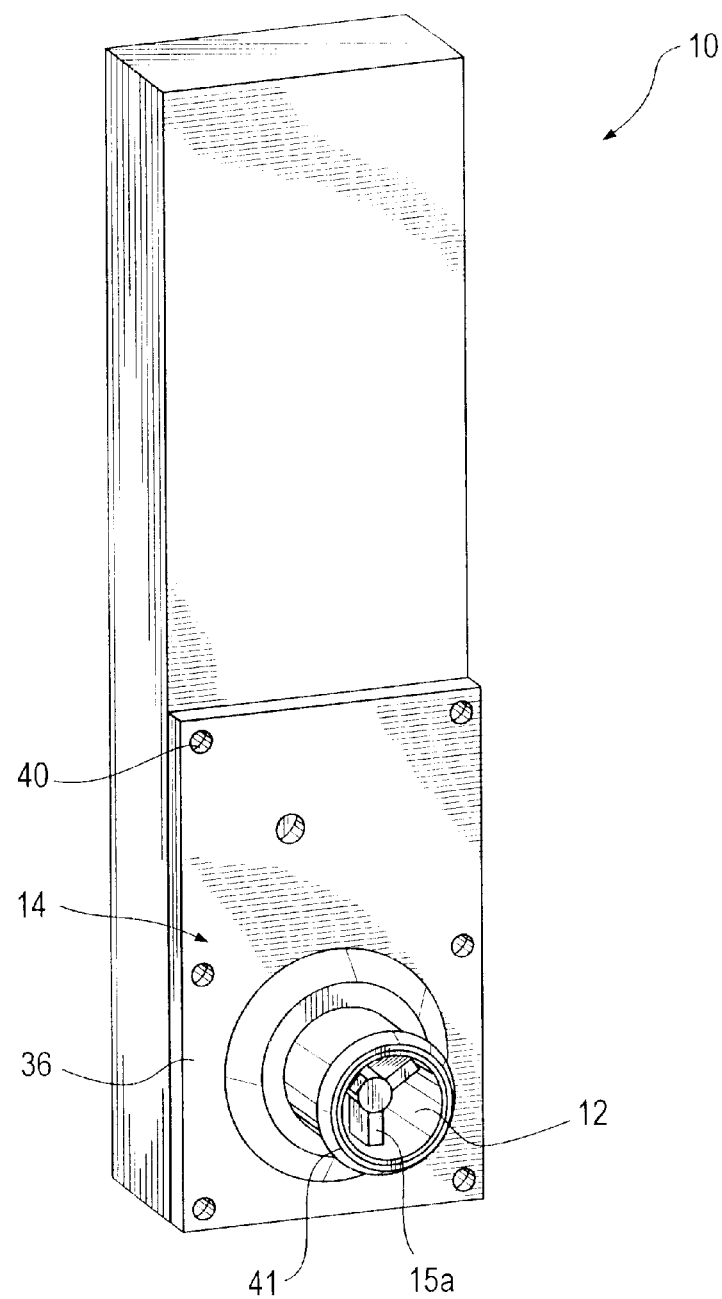
FIG. 1 is a three-dimensional, perspective view of an end plate of a humidity exchanger used in a fuel cell assembly in which the end plate includes an isolation valve.
Figure 2:
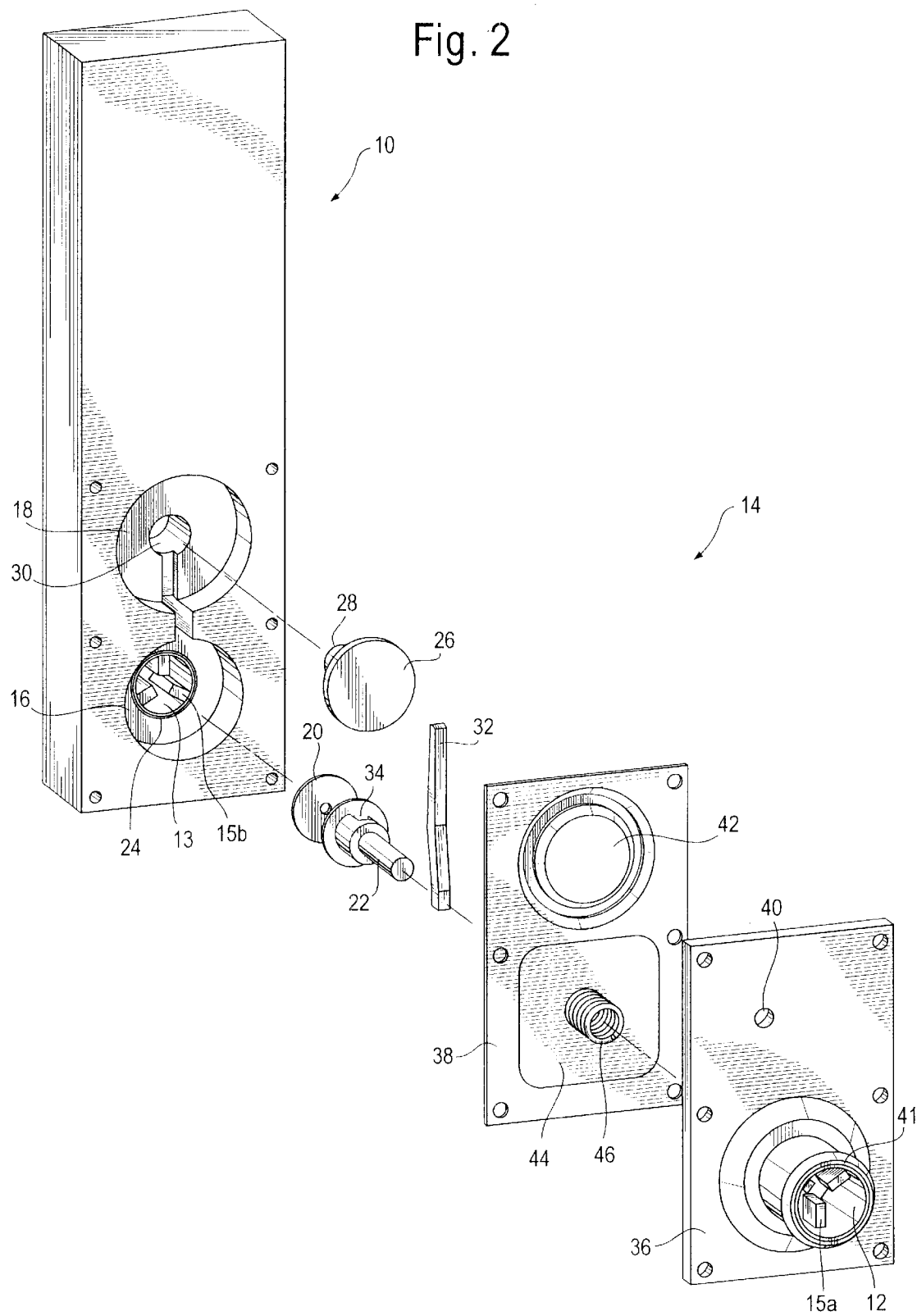
FIG. 2 is an exploded perspective view of the stack isolation valve illustrated in FIG. 1.

Referring first to FIGS. 1 and 2, reference numeral 10 generally designates an end plate of an oxidant humidity exchanger used in a fuel cell assembly for purposes of humidifying an oxidant stream to be supplied to a solid polymer electrolyte fuel cell stack. Humidity exchanger end plate 10 has an inlet 12 for an oxidant stream and is provided with an isolation valve 14 which is housed in a pair of recesses 16 and 18 provided in the end plate 10. Recess 16 surrounds oxidant stream inlet 12 and has a bore 13 extending through end plate 10.

Isolation valve 14 comprises a rubber valve face 20 on a valve stem 22 located in recess 16. Valve face 20 cooperates with a valve seat 24 in recess 16 for closing bore 13 to the flow of an oxidant stream therethrough. Valve stem 22 is centred in inlet 12 and bore 13 using centering guides 15a and 15b, respectively.

Valve 14 further comprises a diaphragm plunger 26 housed in recess 18. Diaphragm plunger 26 has a stem 28, which is received in a bore 30 in recess 18 for guiding plunger 26. A rocker 32 extends between plunger 26 and valve stem 22. At one end, rocker 32 is received in a slot 34 in the stem 22 and at its other end, it is received in a slot in plunger 26. The latter slot is not visible in the view shown in FIG. 2.

Valve 14 further comprises a cover plate 36 which is mounted on the end plate 10 by means of screws (not shown) and a gasket 38 which is interposed between cover plate 36 and end plate 10 for forming an air-tight seal.

As further shown in FIG. 2, cover plate 36 includes an opening 40 for receiving a pilot line extending from a fuel supply line feeding the stack to which end plate 10 is attached with fuel. Oxidant stream inlet 12 is also located on cover plate 36 and includes a hose fitting 41 for connection to an oxidant fluid stream.

Gasket 38 includes a diaphragm 42, which is located between the opening 40 on the one side and plunger 26 on the other side. Gasket 38 further has an opening 44, which is located adjacent oxidant stream inlet 12. A spring 46 urges valve face 20 against valve seat 24, thereby closing bore 13 to the flow of oxidant therethrough. This is the case when there is little or no fuel stream flow in the fuel supply line and consequently little or no pressure in the pilot line. When the fuel supply is opened, fluid pressure is exerted on diaphragm 42 through the pilot line. The exertion of fluid pressure on diaphragm 42 through the pilot line depresses diaphragm 42 and plunger 26, which in turn causes rocker 32 to urge valve face 20 away from valve seat 24 against the pressure of spring 46, thereby opening valve 14 and maintaining it in an open position until the pressure in the pilot line drops when the fuel supply is shut off.

In the above example, isolation valve 14 is described as being provided at oxidant inlet 12 of a humidity exchanger. It will be appreciated, however, that an isolation valve 14 can also be provided at the oxidant inlet or outlet of the fuel cell stack.

Figure 3A:
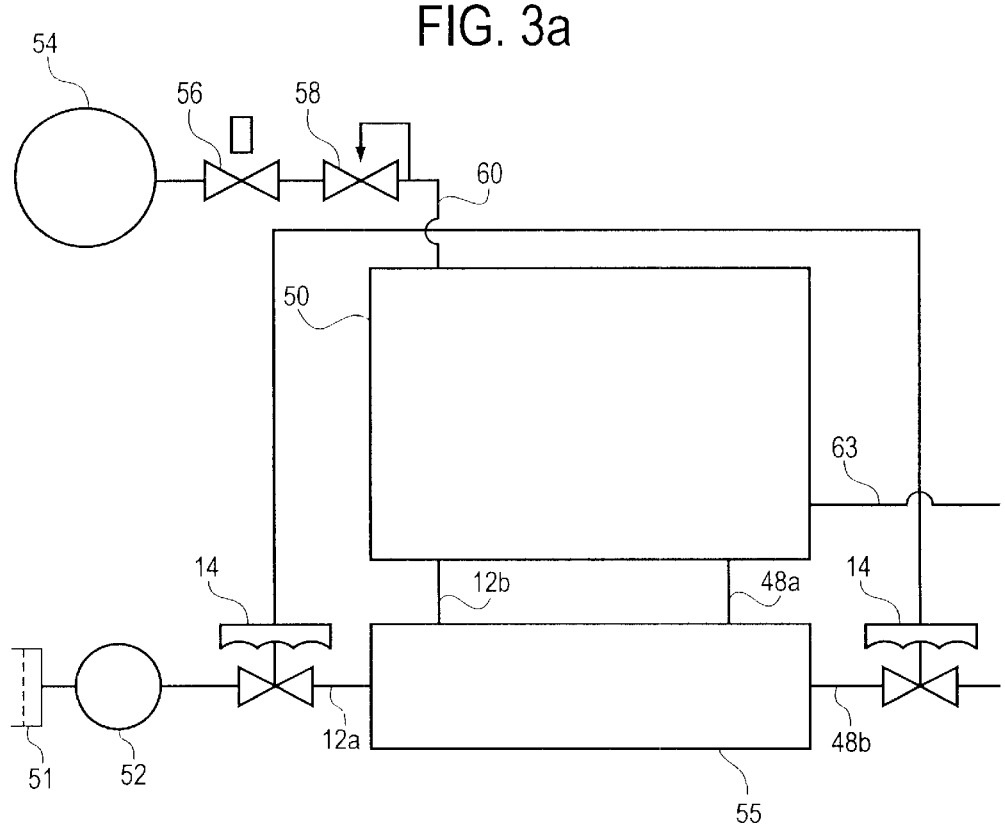
FIGS. 3a and 3b are schematic illustrations of, respectively, a fuel cell assembly comprising a humidity exchanger in which the humidity exchanger includes a pair of isolation valves, and a similar fuel cell assembly but without a humidity exchanger in which the fuel cell stack includes a pair of isolation valves.
Figure 3B:
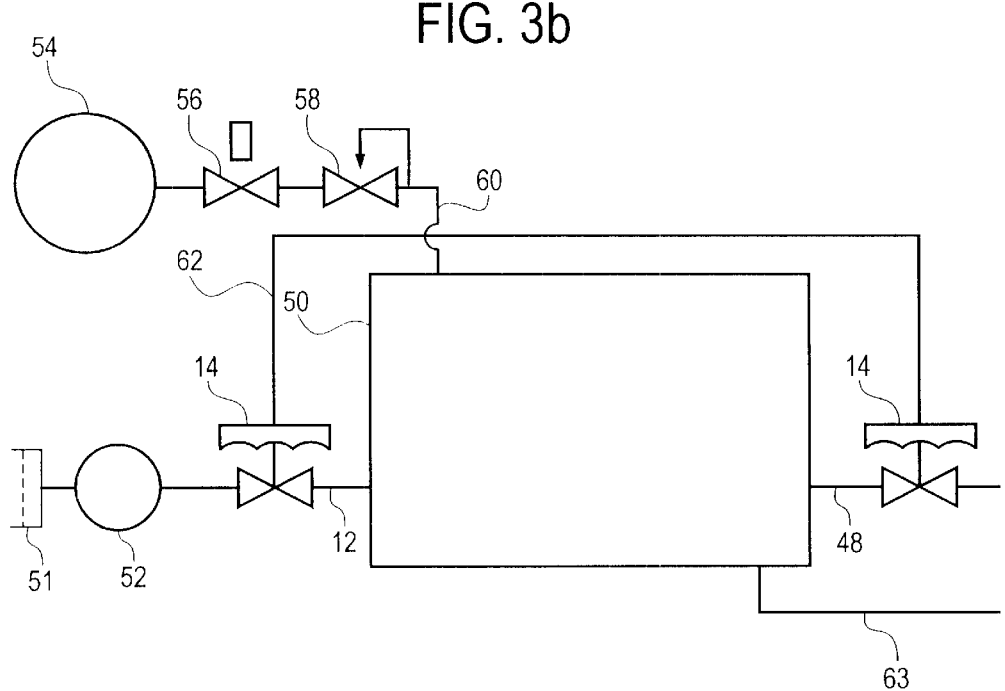

FIGS. 3a and 3b show solid polymer electrolyte fuel cell assemblies with and without an oxidant humidity exchanger, respectively. In FIG. 3a, a fuel cell stack 50 employs a humidity exchanger 55 having an oxidant inlet 12a and humidified oxidant outlet 12b, which also serves as the oxidant inlet to fuel cell stack 50. Further, humidity exchanger 55 has an inlet 48a that receives exhaust oxidant from fuel cell stack 50. After exchanging water vapor with the oxidant supplied at oxidant inlet 12a, the water-depleted exhaust oxidant is vented at outlet 48b.

As shown in FIG. 3a, humidity exchanger inlet 12a and outlet 48b each include an isolation valve 14. FIG. 3b shows a fuel cell assembly that is similar to that of FIG. 3a, except that no humidity exchanger is employed in the fuel cell assembly of FIG. 3b. In the fuel cell assembly of FIG. 3b, fuel cell stack 50 has an oxidant inlet 12 and oxidant outlet 48, each of which has an associated an isolation valve 14.

In both of FIGS. 3a and 3b, reference numeral 51 designates an air filter and reference numeral 52 designates an air pump for providing compressed air (oxidant) to oxidant inlet 12a and 12, respectively. Fuel (such as, for example, hydrogen gas) is supplied from a fuel container 54 via fuel valve 56 and pressure regulator 58 to fuel cell stack 50 through fuel supply line 60. Unreacted fuel is exhausted through outlet pipe 63.

As shown in FIGS. 3a and 3b, each isolation valve 14 is connected to fuel supply line 60 by means of a pilot line 62. Valves 14 are thus automatically opened when fuel valve 56 is opened to supply fuel to stack 50. When stack 50 is shut down, valves 14 close, thereby isolating the cathode flow fields in stack 50 from the external atmosphere. Such isolation prevents the water residing within the cathode flow fields from evaporating and making stack 50 more difficult to start.

Figure 4:
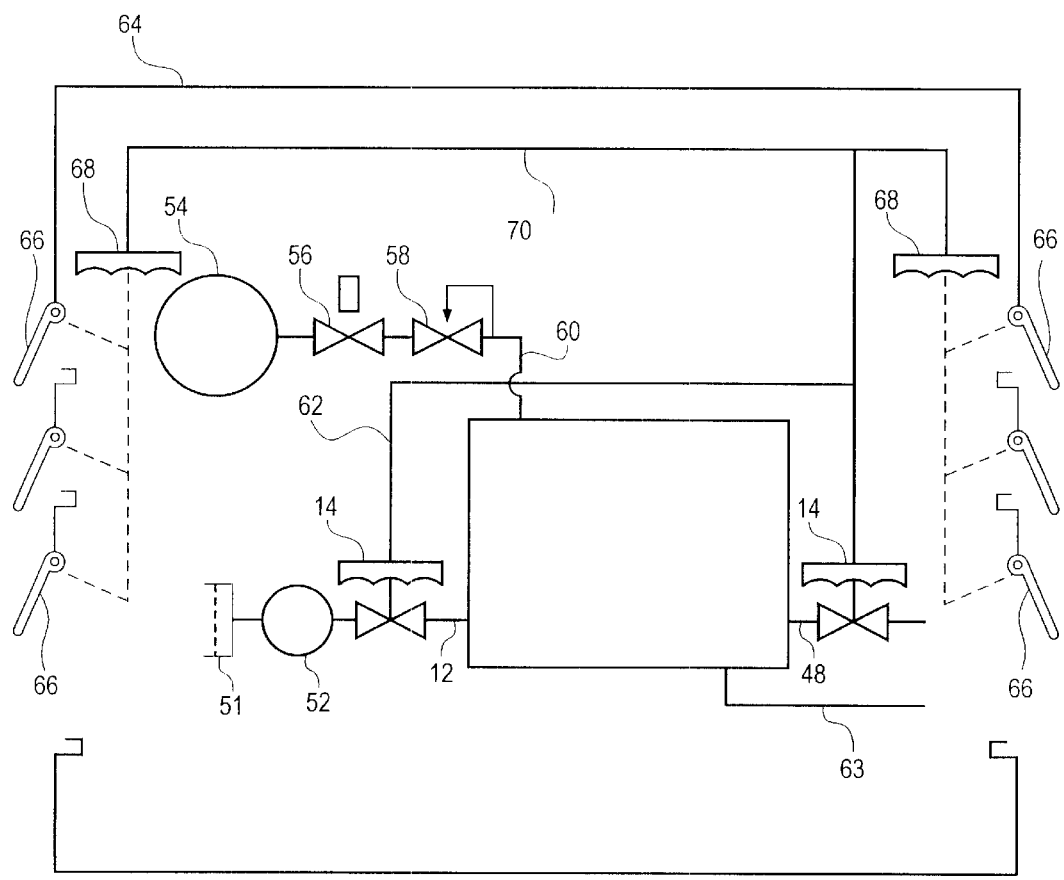
FIG. 4 shows the fuel cell assembly of FIG. 3b also provided with an enclosure having louvers that are capable of being operated in conjunction with the isolation valves.

The foregoing principles can also be applied to isolate an entire fuel cell system from its environment. In FIG. 4, the system of FIG. 3b is shown schematically as including an enclosure 64 having louvers 66, which can open and close. The opening and closing of louvers 66 is effected by means of diaphragm-actuated controllers 68, which are connected by pilot lines 70 to fuel supply line 60, in a manner similar to isolation valves 14. Controllers 68 operate in the substantially the same way as valves 14 in that controllers 68 open louvers 66 when fuel valve 56 is opened (for example, by an actuator button (not shown) on the exterior of enclosure 64). When the fuel is shut off (and the flow of the fuel stream thereby discontinued), louvers 66 are closed and the system is isolated from the environment. The system is thus protected from contamination and can even tolerate submersion in salt water, which is particularly advantageous in the case of marine applications.

Isolation valves may also be provided at a fuel inlet and/or outlet or at a coolant inlet and/or outlet of a fuel cell stack. Isolation valves may also be provided at the inlet and/or outlet of any other working fluid in the fuel cell assembly. In addition, the oxidant supply line or other source of pressure may be employed instead of the fuel supply line to actuate the isolation valve.

While particular elements, embodiments and applications of the present invention have been shown and described, it will be understood, of course, that the invention is not limited thereto since modifications may be made by those skilled in the art without departing from the scope of the present disclosure, particularly in light of the foregoing teachings.

What is claimed is:

1. A method of isolating an electrochemical fuel cell assembly from its surroundings, said fuel cell assembly having an access opening formed therein and comprising a solid polymer electrolyte fuel cell, said method comprising the steps of:

(a) providing the access opening with a closure member that is normally biased to a closed position in which said access opening is closed, said closure member having a pressure activated actuator for urging said closure member to an open position when the actuator is exposed to pressure; and (b) operatively connecting said actuator to a fluid stream of said fuel cell assembly such that said actuator is exposed to fluid pressure of said fluid stream for urging said closure member to said open position, thereby opening said access opening.

2. The method of claim 1, wherein said access opening is one of an inlet for feeding a reactant to said fuel cell assembly and a reactant outlet for exhausting a reactant from said fuel cell assembly.

3. The method of claim 2, wherein said reactant is an oxidant.

4. The method of claim 2, wherein said reactant is a fuel.

5. The method of claim 1, wherein said fluid stream of said fuel cell assembly is a fuel stream.

6. The method of claim 5, wherein said fuel comprises hydrogen.

7. The method of claim 1, wherein said access opening is one of a coolant stream inlet and a coolant stream outlet.

8. The method of claim 1, wherein said closure member is a valve disposed within said access opening.

9. The method of claim 1, wherein said fuel cell assembly is housed inside an enclosure and said access opening is provided in a wall of said enclosure.

10. The method of claim 9, wherein said closure member comprises at least one louver, said at least one louver being operatively arranged to unseal and seal an opening formed in said enclosure.

11. A fuel cell assembly having an access opening formed therein through which the assembly is exposed to its surroundings, said fuel cell assembly comprising:

a solid polymer electrolyte fuel cell; and a closure member movable between an open position and a closed position, said closure member operatively associated with said access opening and normally biased to said closed position such that fluid stream cannot pass through said access opening, thereby isolating said fuel cell assembly from its surroundings, wherein said closure member comprises a pressure-activated actuator for urging said closure member to said open position when said actuator is exposed to pressure.

12. The fuel cell assembly of claim 11, wherein said actuator comprises a conduit for directing therethrough a fluid stream of said fuel cell assembly, such that said actuator is exposed to said fluid stream pressure and said closure member is correspondingly urged to said open position, thereby exposing said access opening to said surroundings.

13. The fuel cell assembly of claim 12, wherein said access opening is one of an inlet for feeding said reactant stream to said fuel cell assembly and an outlet for exhausting said reactant stream from said fuel cell assembly.

14. The fuel cell assembly of claim 12, wherein said access opening is one of an inlet for feeding a coolant stream to said fuel cell assembly and an outlet for exhausting a coolant stream from said fuel cell assembly.

15. The fuel cell assembly of claim 12, wherein said closure member is a valve disposed within said access opening.

16. The fuel cell assembly of claim 11, wherein said fuel cell assembly comprises a fuel cell stack disposed within an enclosure and said access opening is formed in a wall of said enclosure.

17. The fuel cell assembly of claim 16, wherein said closure member comprises at least one louver for opening and closing said access opening.

18. An electrochemical fuel cell assembly comprising:

(a) a solid polymer electrolyte fuel cell comprising first and second fluid flow channels; and (b) an isolation valve switchable between a closed position and an open position for alternatively closing and opening said first fluid flow channel, said valve being normally biased to said closed position for closing said first fluid flow channel during shutdown of said fuel cell assembly, said valve further comprising an actuator that is responsive to fluid pressure in said second fluid flow channel during actuation of said fuel cell assembly for switching said valve to said open position.

19. The fuel cell assembly of claim 18, wherein said first fluid flow channel is an oxidant flow channel that is in fluid communication with a cathode of said fuel cell.

20. The fuel cell assembly of claim 19, further comprising an oxidant stream humidifier, wherein said access opening is an inlet of said oxidant stream humidifier.

21. The fuel cell assembly of claim 18, wherein said second fluid flow channel is a fuel flow channel that is in fluid communication with an anode of said fuel cell.

22. The fuel cell assembly of claim 18, wherein said isolation valve actuator comprises a diaphragm that is moveable between an initial position in which said isolation valve is in said closed position and an activated position in which said diaphragm is under pressure and said isolation valve is in said open position, and said isolation valve actuator further comprises a pilot line extending from said second fluid flow channel to said diaphragm for exposing said diaphragm to fluid pressure in said second fluid flow channel.

* * * * *

UNITED STATES PATENT AND TRADEMARK OFFICE
CERTIFICATE OF CORRECTION

PATENT NO. : 6,576,361 B1
DATED : June 10, 2003
INVENTOR(S) : Russell H. Barton

It is certified that error appears in the above-identified patent and that said Letters Patent is hereby corrected as shown below:

<u>Title page,</u>
Item [56], U.S. PATENT DOCUMENTS, add:

| | | |
|---|---|---|
| -- 5,976,725 | Gamo et al. | 11/1999 |
| 6,242,121 | Pedicini et al. | 06/2001 |
| 6,255,010 | George et al. | 07/2001 |
| 6,322,920 | Tomson | 11/2001 |
| 6,338,472 | Shimazu et al. | 01/2002 |
| 6,350,537 | Pedicni | 02/2002 -- |

Signed and Sealed this

Seventeenth Day of August, 2004

JON W. DUDAS
*Acting Director of the United States Patent and Trademark Office*